(12) United States Patent
Harrison et al.

(10) Patent No.: US 9,290,166 B2
(45) Date of Patent: Mar. 22, 2016

(54) VEHICLE BRAKING SYSTEM

(75) Inventors: Dudley John Harrison, West Midlands (GB); Carl Robert Mellings, Redditch (GB)

(73) Assignee: Haldex Brake Products Limited, Nuneaton Warwickshire (GB)

( * ) Notice: Subject to any disclaimer, the term of this patent is extended or adjusted under 35 U.S.C. 154(b) by 0 days.

(21) Appl. No.: 14/125,262

(22) PCT Filed: Feb. 22, 2012

(86) PCT No.: PCT/GB2012/050401
§ 371 (c)(1),
(2), (4) Date: Mar. 3, 2014

(87) PCT Pub. No.: WO2012/168688
PCT Pub. Date: Dec. 13, 2012

(65) Prior Publication Data
US 2014/0183935 A1    Jul. 3, 2014

(30) Foreign Application Priority Data

Jun. 10, 2011 (GB) .................................. 1109730.0

(51) Int. Cl.
*B60T 8/1755* (2006.01)
*B60T 8/17* (2006.01)
*B60T 8/24* (2006.01)
*B60T 8/32* (2006.01)
(Continued)

(52) U.S. Cl.
CPC ................. *B60T 8/1755* (2013.01); *B60T 7/02* (2013.01); *B60T 7/20* (2013.01); *B60T 8/1708* (2013.01); *B60T 8/17554* (2013.01); *B60T 8/243* (2013.01); *B60T 8/323* (2013.01); *B60T 13/68* (2013.01)

(58) Field of Classification Search
CPC .......... B60T 7/20; B60T 8/1755; B60T 13/68
See application file for complete search history.

(56) References Cited

U.S. PATENT DOCUMENTS

| 4,696,521 | A |   | 9/1987 | McCann et al. |       |
|-----------|---|---|--------|---------------|-------|
| 5,251,966 | A | * | 10/1993 | Friederichs et al. | 303/7 |
| 5,333,940 | A | * | 8/1994 | Topfer        | 303/7 |

(Continued)

FOREIGN PATENT DOCUMENTS

| EP | 0586203 | 3/1994 |
| EP | 0829406 | 3/1998 |

(Continued)

OTHER PUBLICATIONS

International Search Report and Written Opinion of the International Searching Authority, International Application No. PCT/GB2012/050401, EPO, Jun. 25, 2012.

(Continued)

*Primary Examiner* — Bradley King
(74) *Attorney, Agent, or Firm* — Young Basile Hanlon & MacFarlane P.C.

(57) ABSTRACT

A vehicle braking system includes a brake actuator, a braking control valve assembly and an emergency apply valve having a control port which is connected to the supply line by a further control line. The braking system also includes an electrically operable brake apply valve that is movable between a first position in which fluid flow along the further control line is permitted and a second position in which fluid flow along the further control line is substantially prevented and the control of the emergency apply valve is connected to a low pressure region.

16 Claims, 5 Drawing Sheets

(51) Int. Cl.
*B60T 7/02* (2006.01)
*B60T 7/20* (2006.01)
*B60T 13/68* (2006.01)

(56) References Cited

U.S. PATENT DOCUMENTS

2008/0067862 A1* 3/2008 Parrott et al. .................. 303/7
2010/0237690 A1* 9/2010 Forster et al. ................ 303/13

FOREIGN PATENT DOCUMENTS

| EP | 1785325 A1 * | 5/2007 |
| WO | 03101784 | 12/2003 |
| WO | 2005063540 | 7/2005 |

OTHER PUBLICATIONS

UK Search Report Under Section 17, UKIPO, Oct. 21, 2011.

* cited by examiner

VEHICLE BRAKING SYSTEM

CROSS-REFERENCE TO RELATED APPLICATIONS

This application is the national stage application of, and claims priority to, International Application No. PCT/GB2012/050401 filed Feb. 22, 2012, the entire disclosure of which is incorporated herein by reference. The International Application was published in the English language on Dec. 13, 2012 as International Publication No. WO 2012/168688 and itself claims the benefit of United Kingdom Patent Application No. 1109730.0 filed Jun. 10, 2011, the entire disclosure of which is incorporated herein by reference.

The present invention relates to a braking system, particularly, but not exclusively to a braking system for a trailer of a road vehicle comprising a tractor and trailer combination.

Large commercial trailers are typically fitted with two types of brake actuators—a service actuator in which air pressure on a piston or diaphragm pushes a rod which applies mechanical turning force to the input shaft of the brake and a service/spring actuator which includes, in addition to a service actuator, a spring actuator comprising an internal coil spring which acts on the pushrod, which can be compressed when a second chamber is pressurised. The brakes can be applied therefore by either increasing pressure supplied to the service actuator as normal and/or by a reducing the pressure supplied to the spring actuator. A common configuration, for example, is a semi-trailer with three axles, the front of which has service actuators and the middle and rear of which has service/spring actuators. Other combinations are possible, however.

In the normal driving condition the spring actuators are pressurised from the compressed air supply line (or trailer reservoir) to hold them off. Graduated braking in response to driver demand for braking is effected via the service actuators. The present invention relates to a system for actuating the service brake of a trailer or semi-trailer.

DETAILED DESCRIPTION

Figure 1A:
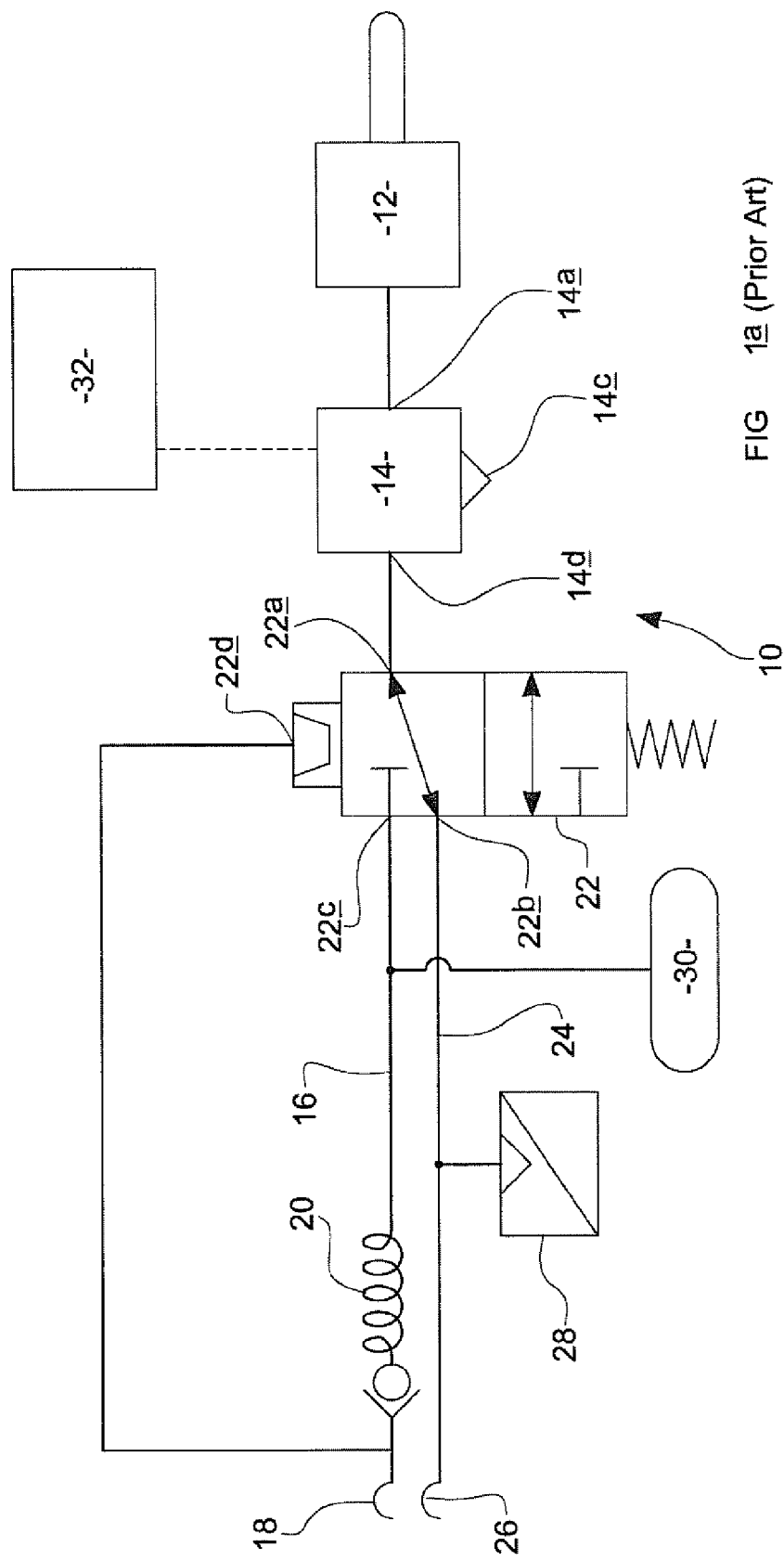
FIG. 1a is a schematic illustration of a prior art trailer service braking system in a first position.
Figure 1B:
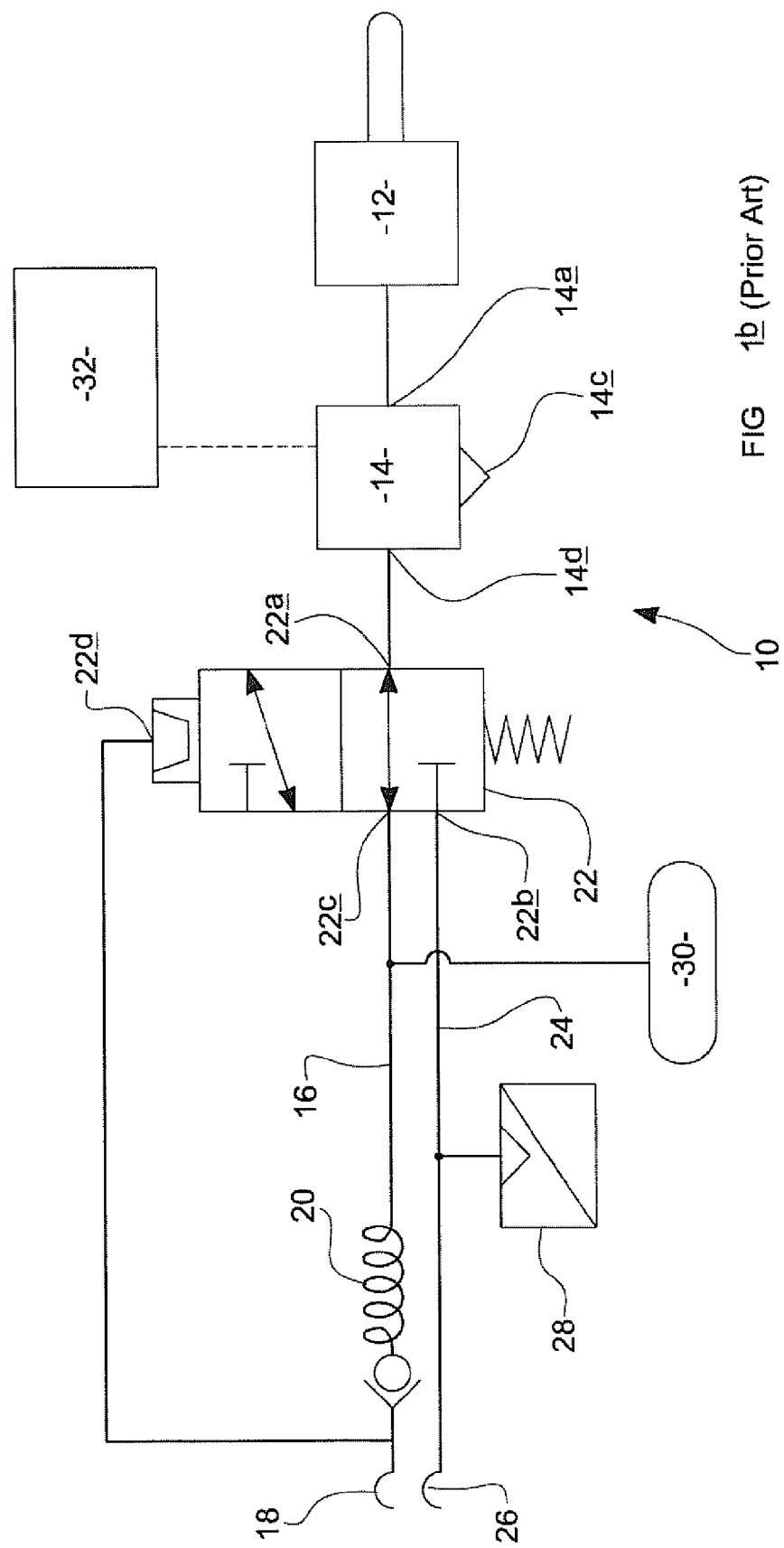
FIG. 1b is a schematic illustration of the prior art trailer service braking system of FIG. 1a in a second position.

FIGS. 1a and 1b show a schematic illustration of a prior art trailer service braking system 10 comprising a service actuator 12 which is connected to a delivery port 14a of braking of a braking control valve assembly, which in this embodiment of the invention is an anti-lock braking system (ABS) modulator valve assembly 14. In addition to the delivery port 14a, the modulator valve assembly 14 has an exhaust port 14c which is connected to a low pressure region (typically the atmosphere), and a control port 14d.

The control port 14d is connected to the outlet 22a of a pilot operated emergency apply valve 22. In addition to the outlet 22a, the emergency apply valve 22 has a first inlet 22b, a second inlet 22c, and a control port 22d, the first inlet 22b being connected to a control line 24, the second inlet 22c and the control port 22d being connected to a supply line 16. The emergency apply valve 22 is a two position valve which is movable between a first position (illustrated in FIG. 1a) in which the first inlet 22b is connected to the outlet 22a whilst the second inlet 22c is closed, and a second position (illustrated in FIG. 1b) in which the first inlet 22b is closed whilst the second inlet 22c is connected to the outlet 22a. The emergency apply valve 22 is provided with resilient biasing means (a spring) which urges it to the second position, and will move to the first position when the fluid pressure at the control port 22d is sufficient to overcome the biasing force of the spring.

The supply line 16 is, in use, connected to a source of pressurised fluid (typically compressed air). When the trailer is pulled by a towing vehicle (tractor), the source of pressurised fluid is typically provided on the tractor, so the supply line 16 extends to a pneumatic or hydraulic supply connector 18 which is adapted, in use, to be connected to the source of pressurised fluid via a corresponding connector on the tractor. A non-return (or one-way) valve 20 is provided in the supply line 16, the non-return valve 20 permitting flow of fluid along the supply line 16 to the emergency apply valve whilst substantially preventing flow of pressurised fluid in the opposite direction from the emergency apply valve to the supply connector 18.

The control port 22d of the emergency apply valve 22 is connected to the supply line 16 upstream of the non-return valve 20, so that the non-return valve 20 is located in the supply line between the emergency apply valve 22 and the connection to the control port 22d.

The control line 24 is connected to a source of a pressurised fluid braking demand signal. When the trailer is pulled by a towing vehicle (tractor), the pressurised fluid braking demand signal typically originates on the tractor and is typically generated by a driver operating a foot pedal provided on the tractor. As such, the control line 24 extends to a pneumatic or hydraulic control connector 26 which is adapted, in use, to be connected to the source of pressurised fluid braking demand signal via a corresponding connector on the tractor. Typically, a pressure transducer 28 is provided to measure the fluid pressure in the control line 24.

The modulator valve assembly 14 is operable to move between a build position in which the delivery port 14a is connected to a source of pressurised fluid whilst the exhaust port 14c is closed, a hold position in which the delivery port 14a and the exhaust port are 14c are closed, and an exhaust position in which the delivery port 14a is connected to the exhaust port 14c. The modulator valve assembly 14 may be configured such that, when the valve is in the build configuration, the control port 14d is connected to the delivery port 14a. In this case, the control pressure provides the source of pressurised fluid transmitted to the brake actuator 12a. The modulator valve assembly 14 is typically, however, a relay valve in which the control port 14d is connected to a control chamber, the delivery port 14a being connected to a separate source of pressurised fluid (reservoir 30 for example) when the modulator valve assembly 14 is in the build position.

The modulator valve assembly is also provided with an electrically operable dump valve and hold valve. The modulator valve assembly 14 is configured such that, when there is no supply of electrical current to either the dump valve or the hold valve, the supply of pressurised fluid at the control port 14d causes the modulator valve assembly to move to the build position until the pressure at the delivery port 14a is balanced with the pressure at the control port 14d, at which point the modulator valve assembly 14 moves to the hold position. The pressure supplied to the brake actuator 12*a* is thus determined by the pressure at the control port 14*d* as required for normal service braking.

Typically, the modulator valve assembly 14 is configured to move to the hold position when there is supply of electrical current to the hold valve but not to the dump valve, and to move to the exhaust position when there is supply of electrical current to the dump valve and to the hold valve. The modulator valve assembly 14 could equally be configured to adopt the exhaust position when there is supply of electrical current to the dump valve but not the hold valve.

Various configurations of these type of modulator valve assembly for in use in ABS braking systems, and are well known to persons of skill in the art.

It will be appreciated that when the modulator valve assembly 14 is in the build position, and when there is a fluid pressure at the control port 14*d*, this pressurised fluid (or, where the modulator valve assembly is a relay valve, fluid from the alternative source of pressurised fluid) is transmitted to the service actuator 12 or, more precisely, a working chamber in the service actuator 12, and the service actuator 12 is configured to respond to this by actuating a brake to apply a braking force to the trailer. Similarly, when the modulator valve assembly 14 is in the exhaust position, pressurised fluid is exhausted from the service actuator 12 or, more precisely, a working chamber in the service actuator 12, and the service actuator 12 is configured to respond to this by releasing the braking force. When the modulator valve assembly 14 is in the hold position, fluid pressure in the service actuator 12 is maintained, and so any braking force applied by the service actuator 12 is held at a substantially constant level.

Finally, the braking system 10 is provided with a pressurised fluid reservoir 30 which is connected to the supply line 16 downstream of the non-return valve 20.

During normal use, the braking system 10 adopts the configuration shown in FIG. 1*a*. Fluid pressure in the supply line 16 causes the emergency apply valve 22 to move against the biasing force of its spring into its first position. Thus, any fluid pressure braking demand signal generated by driver demand for braking flows via the emergency apply valve 22 and to the control port 14*d* of the modulator valve assembly 14. Pressurised fluid is thus supplied to the service actuator 12, which causes it to move to the brake apply position. A braking force is thus applied to the vehicle.

The braking system 10 is also provided with an electronic braking control unit (ECU) 32 which controls operation of the at least one electrically operable valve in the modulator valve assembly 14. At least one wheel speed sensor (not shown) is provided to monitor the speed of a wheel of the trailer, and conventional anti-lock braking algorithms are employed to detect locking of the wheel. If the wheel lock is detected, the braking ECU 32 controls the electrically operable valves in the modulator valve assembly 14 so that it moves to either the hold position or the exhaust position in accordance with standard ABS control procedures.

If, however, the supply connector 18 becomes disconnected from its connection to the supply of pressurised fluid, the portion of the supply line 16 up-stream of the non-return valve 20 is exhausted to atmosphere. The resulting loss of fluid pressure at the control port 22*d* of the emergency apply valve 22 causes it to move under the action of its spring to its second position as illustrated in FIG. 1*b*. As a result, the control port 14*d* of the modulator valve assembly 14 is connected to the trailer pressurised fluid reservoir 30. The pressurised fluid therefore travels to the service actuator 12 to apply a braking force to the trailer. In other words, this braking system 10 provides for automatic application of the service brake in the event that the trailer becomes disconnected from its normal supply of pressurised fluid. The braking ECU 32 operates to provide conventional ABS control in the event of wheel slip during this emergency braking.

It is also known to provide trailer vehicles with a stability control system which detects (for example using wheel speed or lateral acceleration sensors) if the stability of the vehicle is comprised, e.g. if the vehicle is cornering so fast that the vehicle is likely to roll over, and initiates a stability control intervention if it is. A stability control intervention could be the automatic reduction in the driving torque from the engine, or automatic application of the vehicle brakes. The latter kind of stability control system is typically employed in trailers equipped with an electronic braking system (EBS), as such a system already provides a means for electrically/electronically initiated braking.

According to a first aspect of the invention we provide a vehicle braking system comprising a brake actuator which is operable to adopt a brake apply position in which the actuator may apply a braking force to a vehicle wheel and a brake release position in which the actuator may release any braking force applied to a vehicle wheel, supply of pressurised fluid to the actuator causing the brake actuator to move to the brake apply position and release of pressurised fluid from the actuator causing the brake actuator to move to the brake release position, a braking control valve assembly having a delivery port which is connected to the actuator by means of which pressurised fluid may be supplied to the actuator, a supply line which is connected to a source of pressurised fluid, and a braking control line which is adapted in use to be connected to a source of a fluid pressure braking demand signal, the system further including an emergency apply valve having a control port which is connected to the supply line by means of a further control line and which is movable in response to fluid pressure at the control port between a first position in which the braking control line is connected to a control port of the braking control valve assembly, and a second position in which the supply line is connected to the control port of the braking control valve assembly, wherein the braking system is also provided with a electrically operable brake apply valve in the further control line, the brake apply valve being movable between a first position in which fluid flow along further control line is permitted and a second position in which fluid flow along the further control line is substantially prevented and the control port of the emergency apply valve is connected to a low pressure region.

The vehicle may be a trailer of a road vehicle.

In one embodiment of the invention, the brake apply valve is provided with an electrically operable valve actuator which moves the valve from the first position to the second position, when there is supply of sufficient electrical power to the valve actuator. In this case, the brake apply valve may be provided with a resilient biasing element which moves the valve from the second position to the first position when there is no electrical power supplied to the valve actuator.

In one embodiment of the invention the emergency apply valve is provided with a resilient biasing element which moves the valve to its second position when the fluid pressure at its control port is below a predetermined level. In this case, the emergency apply valve may be configured to move to its first position when the fluid pressure at its control port exceeds a predetermined level.

In one embodiment of the invention the system further comprises a pressurised fluid reservoir which is connected to the supply line.

A one-way valve may be provided in the supply line between the emergency apply valve and the connection between the supply line and the further control line, the one-way valve permitting flow of fluid along the supply line towards the emergency apply valve whilst substantially preventing flow of fluid along the supply line in the opposite direction. In this case, the pressurised fluid reservoir is connected to the supply line between the one-way valve and the emergency apply valve.

The braking control valve assembly may be an ABS modulator valve assembly.

In one embodiment of the invention, the braking control valve assembly further includes an exhaust port which connected to a low pressure region and is electrically operable to move between a build position in which its delivery port is connected to a source of pressurised fluid whilst its exhaust port is closed, a hold position in which flow of fluid through the delivery port and exhaust port is substantially prevented, and an exhaust position in which the delivery port is connected to the exhaust port. In this case, preferably supply of electrical power of the braking control valve assembly is required to move the assembly to either the exhaust or hold positions. Moreover, the system may further comprise an electronic braking controller which controls the supply of electrical power to the braking control valve assembly. In this case, preferably the electronic braking controller also controls the supply of electrical power to the brake apply valve.

According to a second aspect of the invention we provide a vehicle stability control system including a braking system according to the first aspect of the invention and a sensor for determining if the stability of the vehicle is compromised.

According to a third aspect of the invention we provide a method of operating a vehicle stability control system according to the second aspect of the invention wherein, if it is determined that the stability of the vehicle is compromised, sufficient electrical power is supplied to the brake apply valve so that the brake apply valve moves to its second position, and the service brake actuator acts to apply a braking force to the vehicle.

Figure 2A:
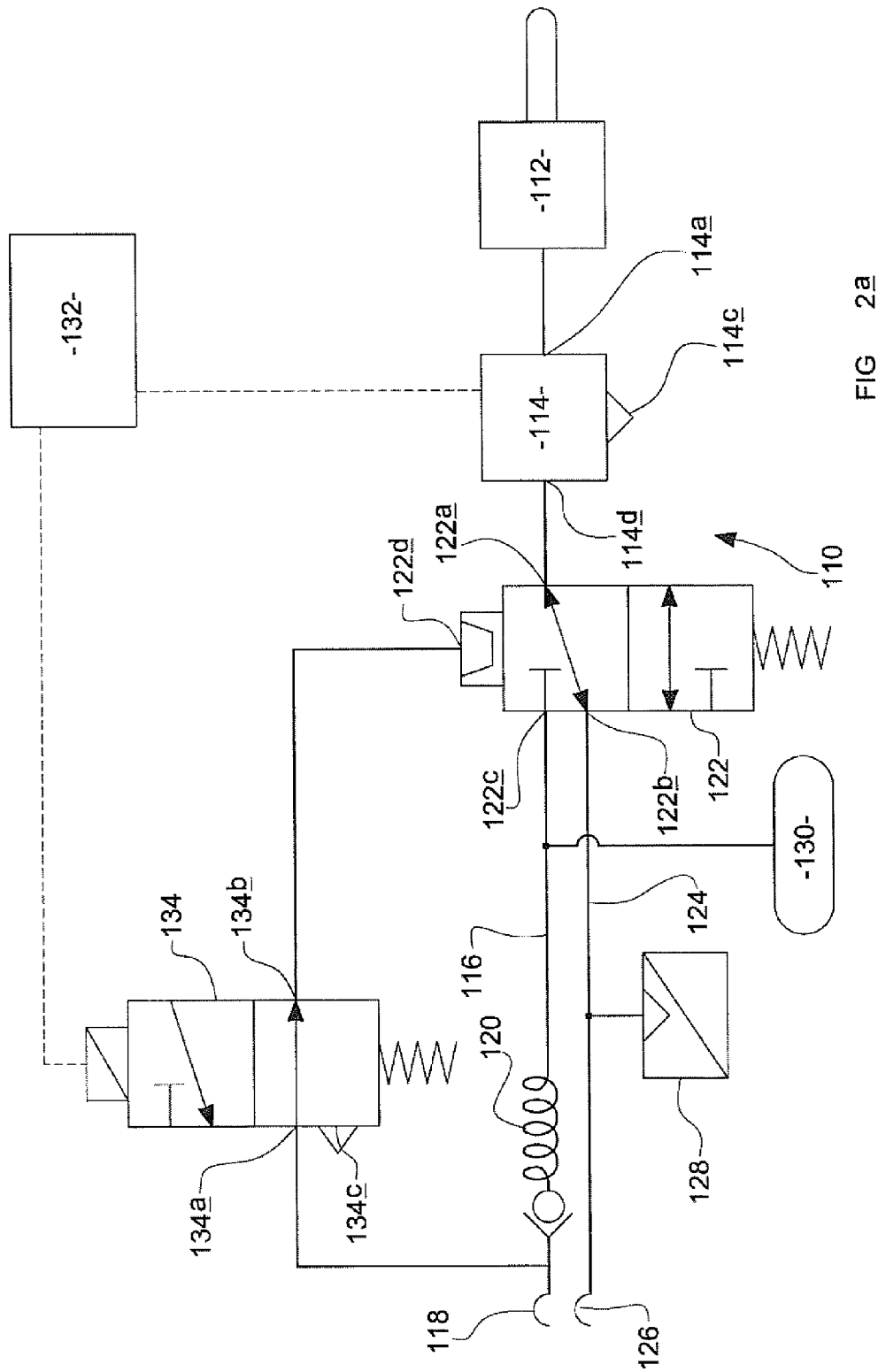
FIG. 2a is a schematic illustration of a trailer braking system in a normal braking configuration.
Figure 2B:
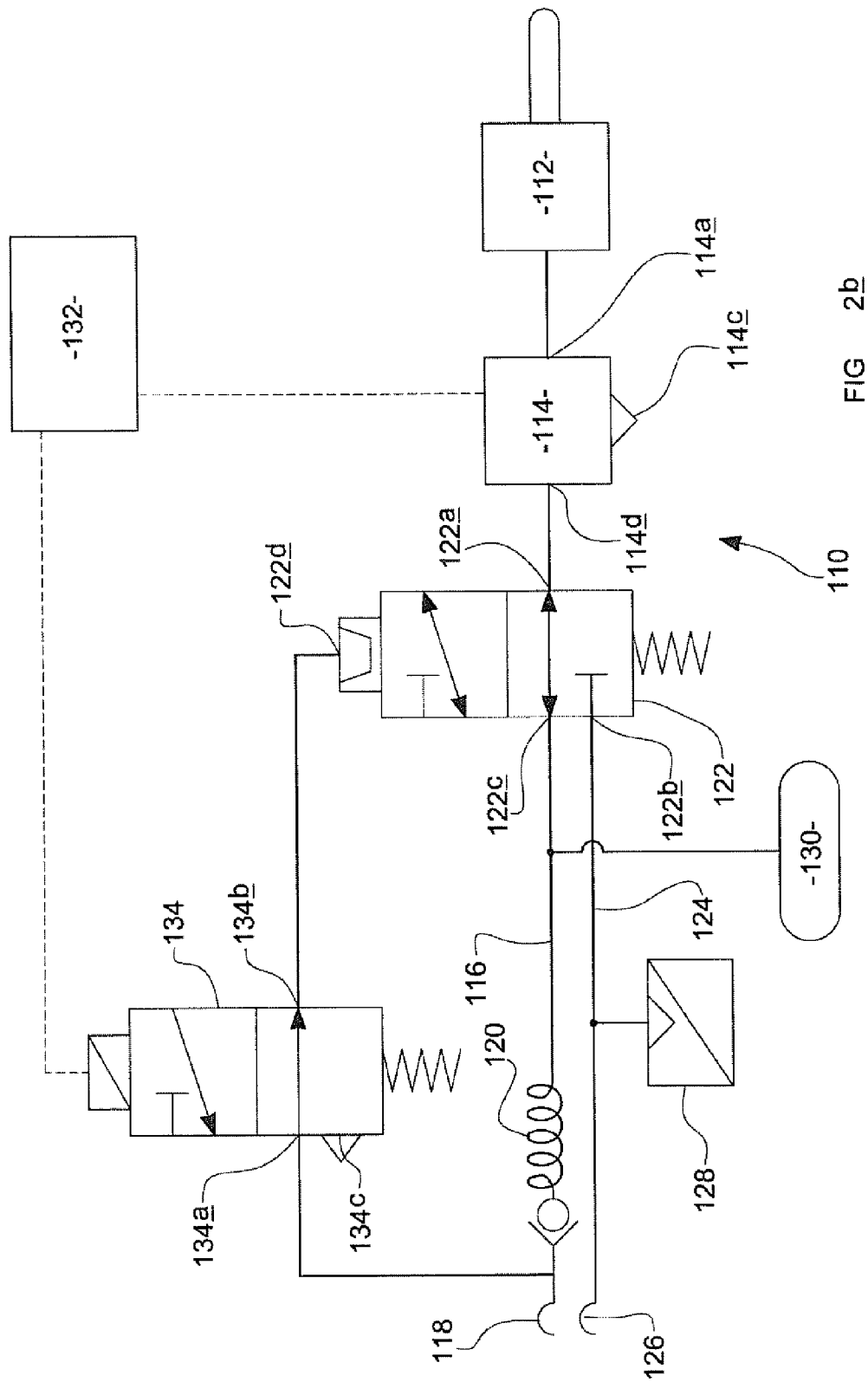
FIG. 2b is a schematic illustration of the trailer braking system of FIG. 2a in an emergency braking configuration.
Figure 2C:
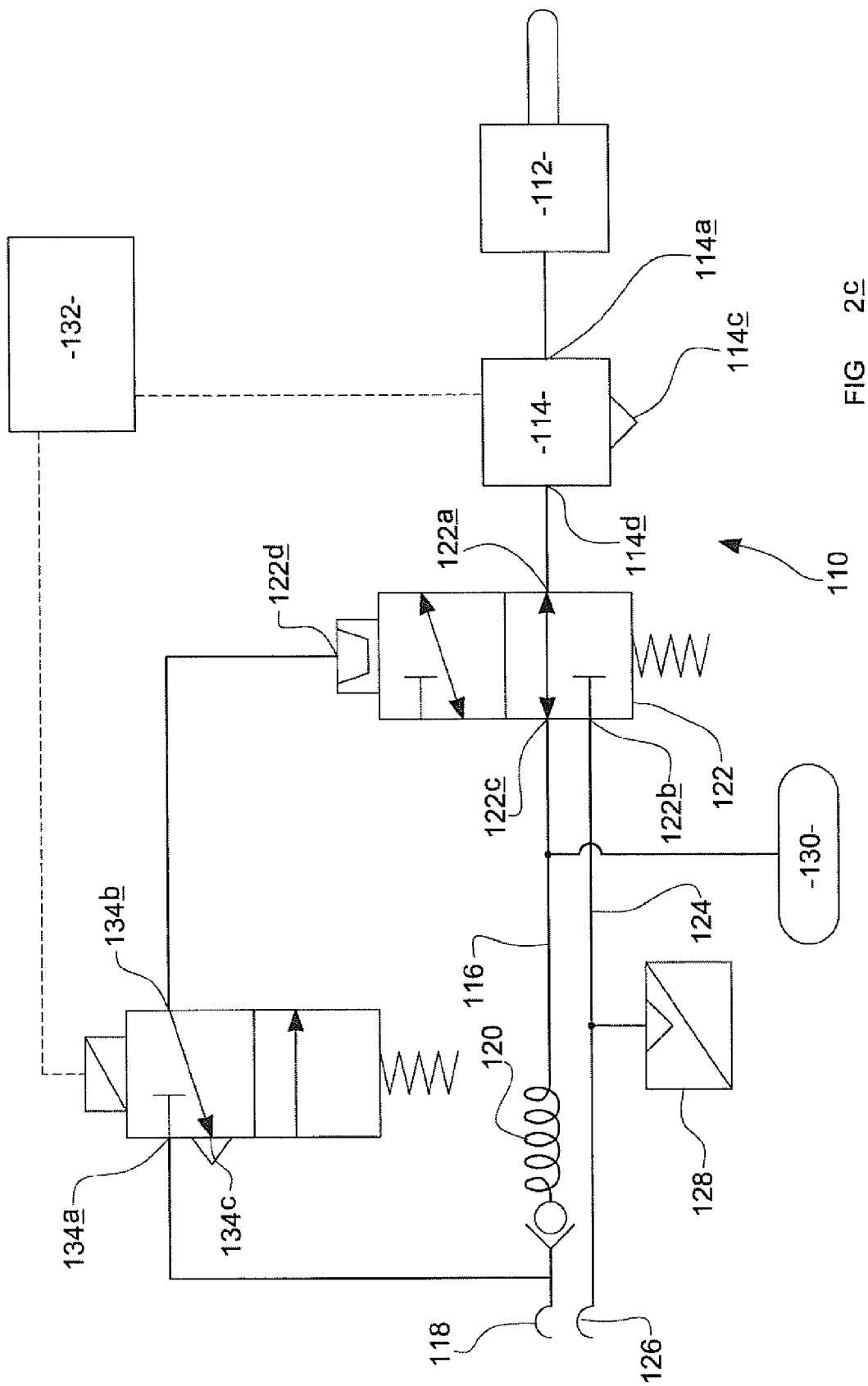
FIG. 2c is a schematic illustration of the trailer braking system of FIG. 2a in an electronic braking configuration.

An embodiment of the invention will now be described, by way of example only, with reference to the accompanying figures of which, FIG. 2a shows a schematic illustration of a trailer braking system in accordance with the invention in the normal braking configuration, FIG. 2b shows a schematic illustration of the trailer braking system in accordance with the invention in the emergency braking configuration, and FIG. 2c shows a schematic illustration of the trailer braking system in accordance with the invention in the electronic braking configuration.

Referring now to FIGS. 2a, 2b, and 2c, there is shown a trailer braking system 110 which has a service brake actuator 112, a modulator valve assembly 114, a supply line 116, a supply connector 118, a non-return valve 120, an emergency apply valve 122, a control line 124, a control connector 126, a pressure transducer 128, a trailer pressurised fluid reservoir 130, and a braking ECU 132 all arranged just as described above in relation to the prior art system 10 shown in FIGS. 1a and 1b. The difference between the prior art system 10 and system 110 shown in FIGS. 2a, 2b, and 2c is that there is an electrically operated brake apply valve 134 provided in the line between the control port 122d of the emergency apply valve 122 and the supply line 116. The brake apply valve 134 has an inlet 134a which is connected to the supply line 116, an outlet 134b which is connected to the control port 122d of the emergency apply valve 122, and an exhaust port 134c which vents to a low pressure region, typically the atmosphere. The brake apply valve 134 is movable between a first position (illustrated in FIGS. 2a and 2b) in which the inlet 134a is connected to the outlet 134b, and a second position (illustrated in FIG. 2c) in which the inlet 134a is closed and the outlet 134b is connected to the exhaust port 134c. The brake apply valve 134 is also provided with a resilient biasing element (a spring) which urges the brake apply valve 134 into the first position, and an electrically operable actuator (for example a solenoid or piezoelectric element) which, when supplied with electrical power, causes the valve to move against the biasing force of the spring into the second position. Advantageously, the brake apply valve 134 is electrically connected to the braking ECU 132 so that the braking ECU 132 controls the supply of electrical power to the electrical actuator of the brake apply valve 134.

During normal use, no electrical power is supplied to the brake apply valve 134, and the braking system 110 operates in the same way as the prior art braking system 10 described in relation to FIG. 1a above. This is illustrated in FIG. 2a. Similarly, if the supply line 116 loses its connection to a supply of pressurised fluid, the braking system 110 operates in the same way as the prior art braking system 10 as described in relation to FIG. 1b above. This is illustrated in FIG. 2b.

The braking system 110 according to the invention may, however, be operated to apply a braking force to the trailer when the supply line 116 is connected to a supply of pressurised fluid and when there is no driver demand for braking—for example if a stability control system has determined that the stability of the vehicle is compromised and braking of the vehicle is required to improve the stability of the vehicle. To achieve this, electrical power is supplied to the brake apply valve 134. This causes it to move against the biasing force of its spring into its second position as illustrated in FIG. 2c. The control port 122d of the emergency apply valve 122 is thus vented to atmosphere, and so the emergency apply valve 122 moves under the influence of its spring to its second position. The control port 114d of the modulator valve assembly 114 is thus connected to the trailer reservoir 130, and pressurised fluid is supplied to the brake actuator 112 which applies a braking force to the trailer just as occurs under emergency braking conditions. Again, the braking ECU 132 may be operated, if desired, to provide conventional anti-lock protection during the braking event.

When braking is no longer required, the supply of electrical power to the brake apply valve 134 is ceased, and the brake apply valve 134 and emergency apply valve 122 move back under the influence of their springs to their first positions as illustrated in FIG. 2a. The ECU 132 is programmed to operate the electrically operable valve or valve of the modulator valve assembly 114 to move the modulator valve assembly 114 to the exhaust position, and thus to vent fluid pressure from the brake actuator 112. The brake is then released.

The addition of the brake apply valve 134 thus means that the prior art ABS trailer braking system can be used in conjunction with a stability control system without the need to provide full electronic braking system (EBS) control.

When used in this specification and claims, the term "line" covers any type of conduit for pressurised fluid including a passage or bore through a housing, a hose, pipe or tube. It should also be appreciated that, whilst in this example, the modulator valve assembly 114 may be connected to more than one brake actuator.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A trailer capable of being towed by a vehicle comprising a vehicle braking system having a brake actuator which is operable to adopt a brake apply position in which the actuator may apply a braking force to a vehicle wheel and a brake release position in which the actuator may release any braking force applied to a vehicle wheel, supply of pressurised fluid to the actuator causing the brake actuator to move to the brake apply position and release of pressurised fluid from the actuator causing the brake actuator to move to the brake release position, a braking control valve assembly having a delivery port which is connected to the actuator by means of which pressurised fluid may be supplied to the actuator, a supply line which is connected to a source of pressurised fluid, and a braking control line which is adapted in use to be connected to a source of a fluid pressure braking demand signal, the system further including an emergency apply valve having a control port which is connected to the supply line by means of a further control line and which is movable in response to fluid pressure at the control port between a first position in which the braking control line is connected to a control port of the braking control valve assembly, and a second position in which the supply line is connected to the control port of the braking control valve assembly, wherein the braking system is also provided with an electrically operable brake apply valve in the further control line, the brake apply valve being movable between a first position in which fluid flow along further control line is permitted and a second position in which fluid flow along the further control line is substantially prevented and the control port of the emergency apply valve is connected to a low pressure region, and wherein the braking control line is connected to a control connector which is adapted to receive the fluid pressure braking demand signal via a corresponding connector of the vehicle towing the trailer.

2. The trailer of claim 1, wherein the vehicle is a tractor.

3. The trailer of claim 1, wherein the brake apply valve of the vehicle braking system is provided with an electrically operable valve actuator which moves the valve from the first position to the second position, when there is supply of sufficient electrical power to the valve actuator.

4. The tractor of claim 3, wherein the brake apply valve of the vehicle braking system is provided with a resilient biasing element which moves the valve from the second position to the first position when there is no electrical power supplied to the valve actuator.

5. The tractor of claim 1, wherein the emergency apply valve of the vehicle braking system is provided with a resilient biasing element which moves the emergency apply valve to the second position of the emergency apply valve when the fluid pressure at the control port of the emergency apply valve is below a predetermined level.

6. The tractor of claim 5, wherein the emergency apply valve of the vehicle braking system is configured to move to the first position of the emergency apply valve when the fluid pressure at the control port of the emergency apply valve exceeds a predetermined level.

7. The trailer of claim 1, wherein the vehicle braking system further comprises a pressurised fluid reservoir which is connected to the supply line.

8. A vehicle braking system comprising a brake actuator which is operable to adopt a brake apply position in which the actuator may apply a braking force to a vehicle wheel and a brake release position in which the actuator may release any braking force applied to a vehicle wheel, supply of pressurised fluid to the actuator causing the brake actuator to move to the brake apply position and release of pressurised fluid from the actuator causing the brake actuator to move to the brake release position, a braking control valve assembly having a delivery port which is connected to the actuator by means of which pressurised fluid may be supplied to the actuator, a supply line which is connected to a source of pressurised fluid, and a braking control line which is adapted in use to be connected to a source of a fluid pressure braking demand signal, the system further including an emergency apply valve having a control port which is connected to the supply line by means of a further control line and which is movable in response to fluid pressure at the control port between a first position in which the braking control line is connected to a control port of the braking control valve assembly, and a second position in which the supply line is connected to the control port of the braking control valve assembly, wherein the braking system is also provided with an electrically operable brake apply valve in the further control line, the brake apply valve being movable between a first position in which fluid flow along the further control line is permitted and a second position in which fluid flow along the further control line is substantially prevented and the control port of the emergency apply valve is connected to a low pressure region, wherein a one-way valve is provided in the supply line between the emergency apply valve and the connection between the supply line and the further control line, the one-way valve permitting flow of fluid along the supply line towards the emergency apply valve whilst substantially preventing flow of fluid along the supply line in the opposite direction.

9. The vehicle braking system of claim 8, wherein the pressurised fluid reservoir is connected to the supply line between the one-way valve and the emergency apply valve.

10. The trailer of claim 1, wherein the braking control valve assembly is an ABS modulator valve assembly.

11. The trailer of claim 10, wherein the braking control valve assembly of the vehicle braking system further includes an exhaust port which connected to a low pressure region and is electrically operable to move between a build position in which the delivery port is connected to a source of pressurised fluid whilst the exhaust port is closed, a hold position in which flow of fluid through the delivery port and the exhaust port is substantially prevented, and an exhaust position in which the delivery port is connected to the exhaust port.

12. The trailer of claim 11, wherein supply of electrical power of the braking control valve assembly is required to move the assembly to either the exhaust or hold positions.

13. The trailer of claim 11, wherein the vehicle braking system further comprises an electronic braking controller which controls the supply of electrical power to the braking control valve assembly.

14. The trailer of claim 13, wherein the electronic braking controller also controls the supply of electrical power to the brake apply valve.

15. The trailer of claim 1, further comprising:
a sensor for determining if the stability of the vehicle is compromised.

16. The trailer of claim 15 wherein, if it is determined that the stability of the vehicle is compromised, sufficient electrical power is supplied to the brake apply valve so that the brake apply valve moves to the second position of the brake apply valve, and the service brake actuator 12 acts to apply a braking force to the vehicle.

\* \* \* \* \*